US008274571B2

(12) United States Patent
Zhu

(10) Patent No.: US 8,274,571 B2
(45) Date of Patent: Sep. 25, 2012

(54) IMAGE ZOOMING USING PRE-EXISTING IMAGING INFORMATION

(75) Inventor: Jiajun Zhu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 387 days.

(21) Appl. No.: 12/469,905

(22) Filed: May 21, 2009

(65) Prior Publication Data
US 2010/0295971 A1 Nov. 25, 2010

(51) Int. Cl.
*H04N 5/232* (2006.01)
(52) U.S. Cl. ............. 348/211.3; 348/211.2; 348/240.99
(58) Field of Classification Search ............ 348/240.99, 348/E5.055, 207.99, 207.1, 211.2, 211.3; 382/305; 345/632–633
See application file for complete search history.

(56) References Cited

U.S. PATENT DOCUMENTS

| | | | | |
|---|---|---|---|---|
| 5,926,116 A * | 7/1999 | Kitano et al. | ................. | 340/988 |
| 6,377,210 B1 | 4/2002 | Moore | | |
| 6,396,507 B1 * | 5/2002 | Kaizuka et al. | ............... | 345/661 |
| 2001/0014185 A1 | 8/2001 | Chitradon et al. | | |
| 2006/0209089 A1 * | 9/2006 | Date | ............................ | 345/632 |
| 2007/0165103 A1 * | 7/2007 | Arima et al. | ............... | 348/14.01 |
| 2007/0210937 A1 | 9/2007 | Smith et al. | | |
| 2007/0258642 A1 * | 11/2007 | Thota | ............................ | 382/173 |
| 2008/0285890 A1 * | 11/2008 | Han et al. | ...................... | 382/305 |
| 2009/0073191 A1 | 3/2009 | Smith et al. | | |

OTHER PUBLICATIONS

Azuma, Ronald, "A Survey of Augmented Reality," In Presence: Teleoperators and Virtual Environments, vol. 6, Issue 4, Aug. 1997, pp. 355-385.

Abowd, Gregory D. et al., "Cyberguide: A mobile content-aware tour guide," Wireless Networks, vol. 3, 1997, pp. 421-433.
International Search Report and Written Opinion, PCT/US10/34654, dated Jul. 13, 2010.
Hansen, Arne Enger "Designing Mobile Tools for Flora Mapping" PhD thesis, Ostfold University College (Norway), Published May 28, 2007 (online). [retrieved on Feb. 7, 2010]. Retrieved from the Internet <URL: http://mcobapp.hiof.no/wp-content/uploads/hansen07dmt.pdf> entire document.
http://phototour.cs.washington.edu/PhotoTourismPreview-640x480.mov [CD-ROM] 2006.
http://phototour.cs.washington.edu/PhotoTourismFull.mov.[CD-ROM] 2006.
Noah Snavely, Steven M. Seitz, Richard Szeliski, "Photo tourism: Exploring photo collections in 3D," ACM Transactions on Graphics (SIGGRAPH Proceedings), 25(3), 2006, 835-846. [pdf] pbibtex].

(Continued)

*Primary Examiner* — Nhan T Tran
*Assistant Examiner* — Yih-Sien Kao
(74) *Attorney, Agent, or Firm* — Lerner, David, Littenberg, Krumholz & Mentlik, LLP

(57) ABSTRACT

Aspects of the invention pertain to enhanced zooming capability of user devices. A user device such as a mobile phone with a camera may capture images of different objects of interest. The capture and zooming limitations of the user device are overcome by replacing, supplementing or otherwise enhancing the image taken with one or more geo-coded images stored in a database. For instance, if the user attempts to zoom in on a feature of an object of interest and exceeds the zooming capability of the user device, a request is sent to a remote server to provide an image showing the feature of the object of interest at a desired resolution. The server determines which, if any, stored images correlate to the captured image of the object of interest. The resulting imagery is provided to the user device and is presented on a display.

16 Claims, 12 Drawing Sheets

OTHER PUBLICATIONS url:phototour.cs.washington.edu/PhotoTourismPreview-640x480. mov; Noah Snavely, Steven M. Seitz, Richard Szeliski, "Photo tourism: Exploring photo collections in 3D," ACM Transactions on Graphics (SIGGRAPH Proceedings), 25(3), 2006, 835-846. {Retrieved from Web on Jan. 18, 2012].

url:phototour.cs.washington.edu/PhotoTourismFull.mov; Noah Snavely, Steven M. Seitz, Richard Szeliski, "Photo tourism: Exploring photo collections in 3D," ACM Transactions on Graphics (SIGGRAPH Proceedings), 25(3), 2006, 835-846. {Retrieved from Web on Jan. 18, 2012].

Website: Photo Tourism, url: phototour.cs.washington.edu [Retrieved from Web on Jan. 18, 2012].

* cited by examiner

FIG. 5A
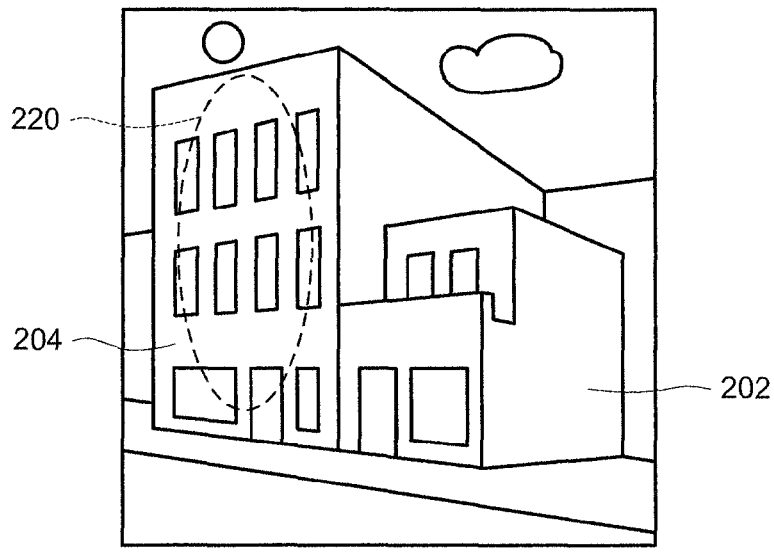
FIG. 5B
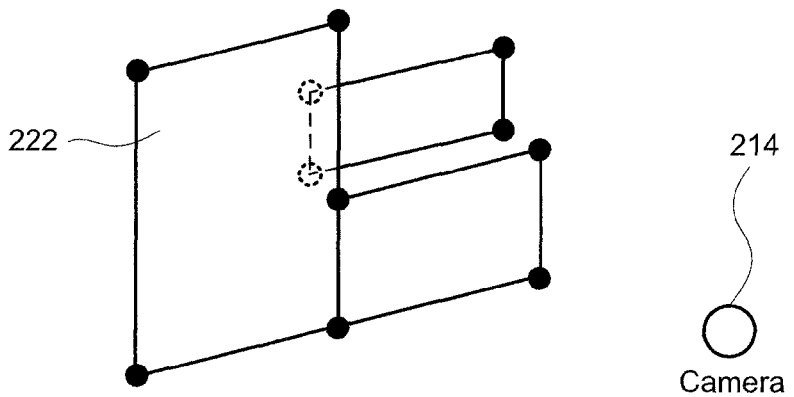
FIG. 5C
Object Position Data
Camera = (Lat$_1$°, Lon$_1$°, Alt$_1$ meters)
Surface 1
• Vertex 1 = (Lat$_2$°, Lon$_2$°, Alt$_2$ meters)
• Vertex 2 = (Lat$_3$°, Lon$_3$°, Alt$_3$ meters)
• Vertex 3 = (Lat$_4$°, Lon$_4$°, Alt$_4$ meters)
• Vertex 4 = (Lat$_5$°, Lon$_5$°, Alt$_5$ meters)
....
Pixel at $(x_a, y_a)$ = Surface 1
Pixel at $(x_b, y_b)$ = Surface 2

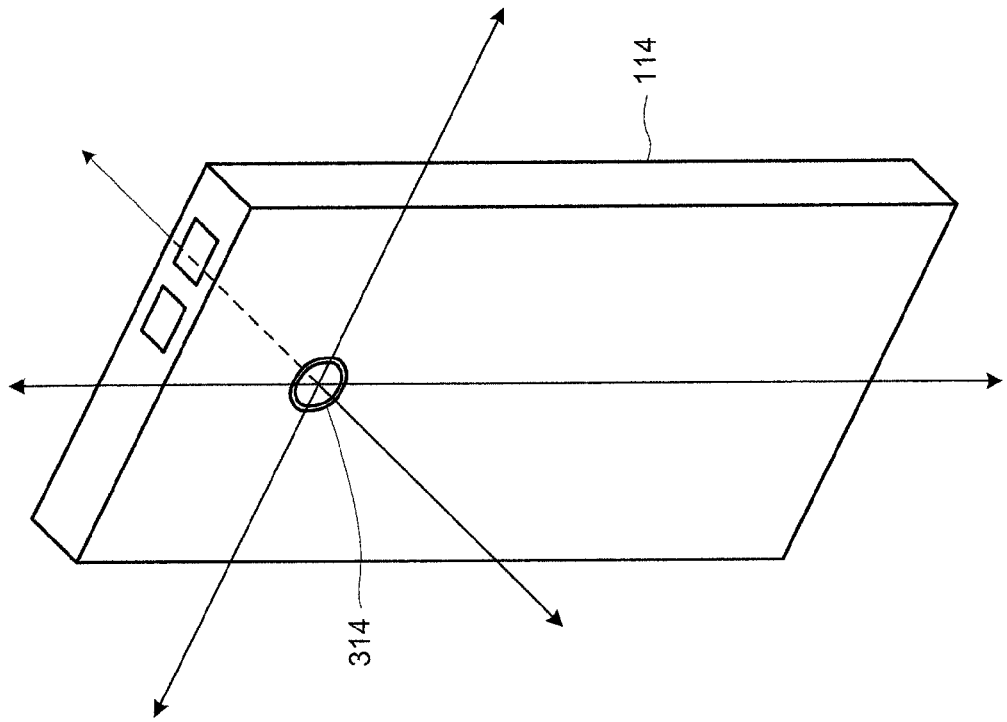
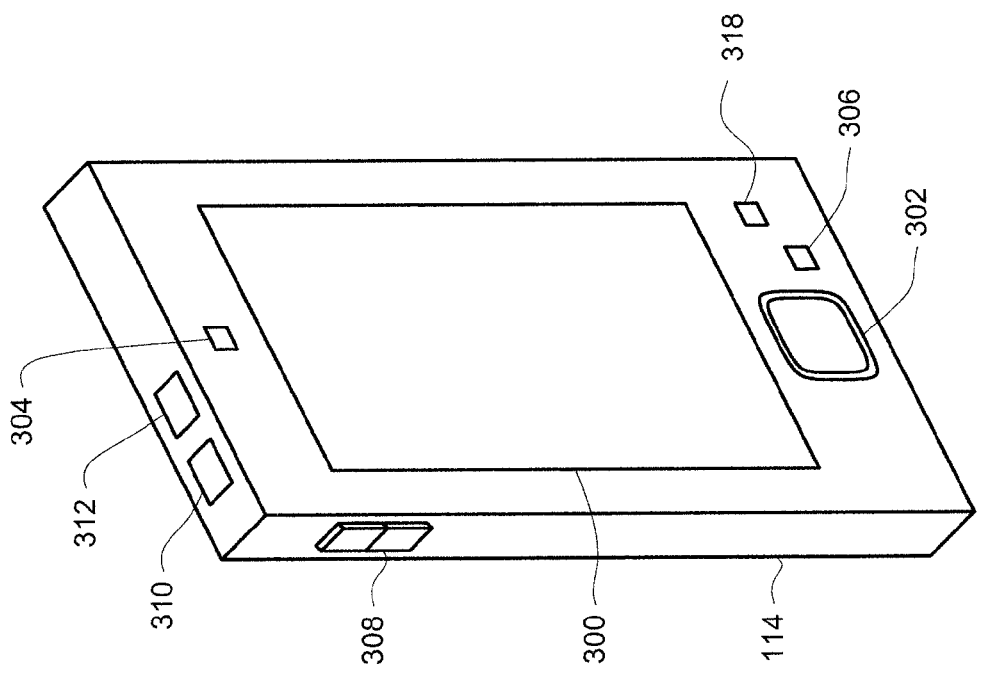

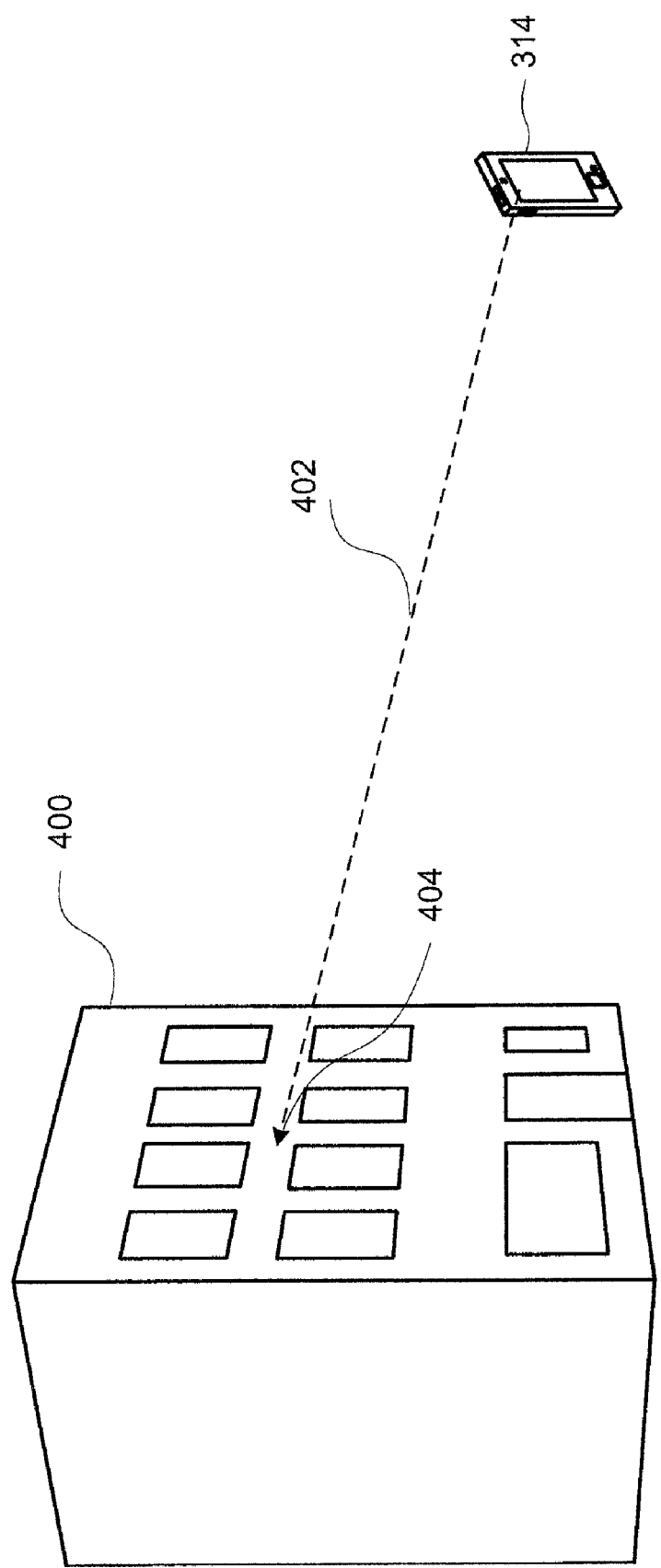

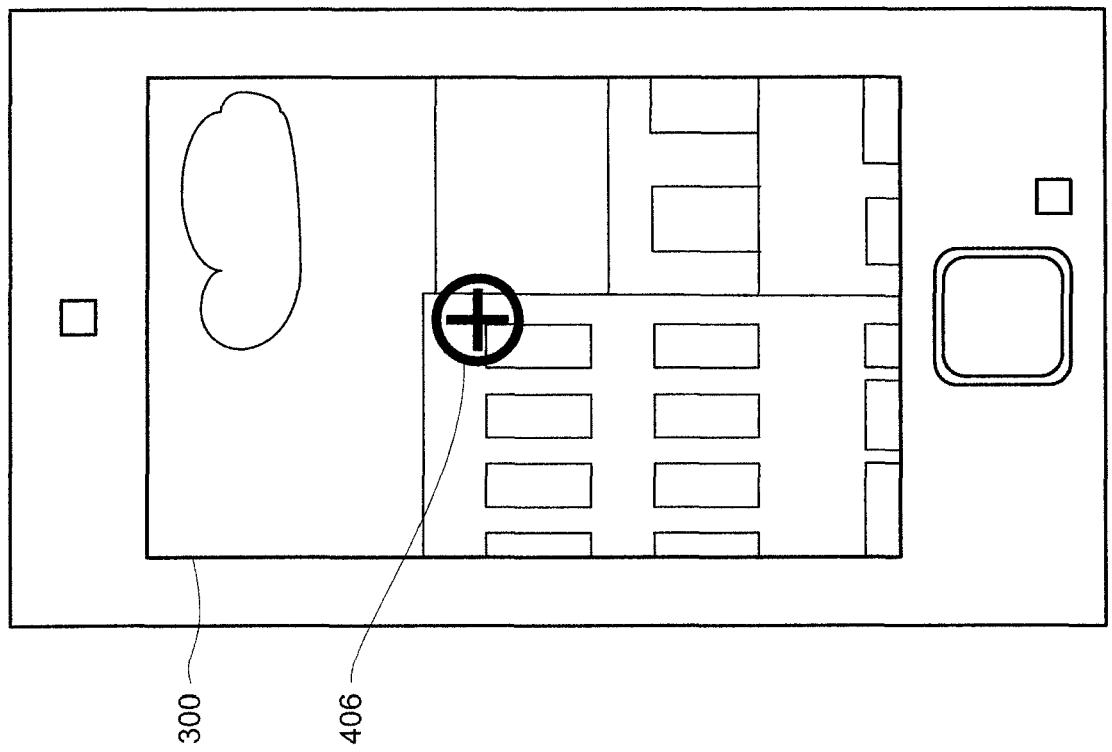

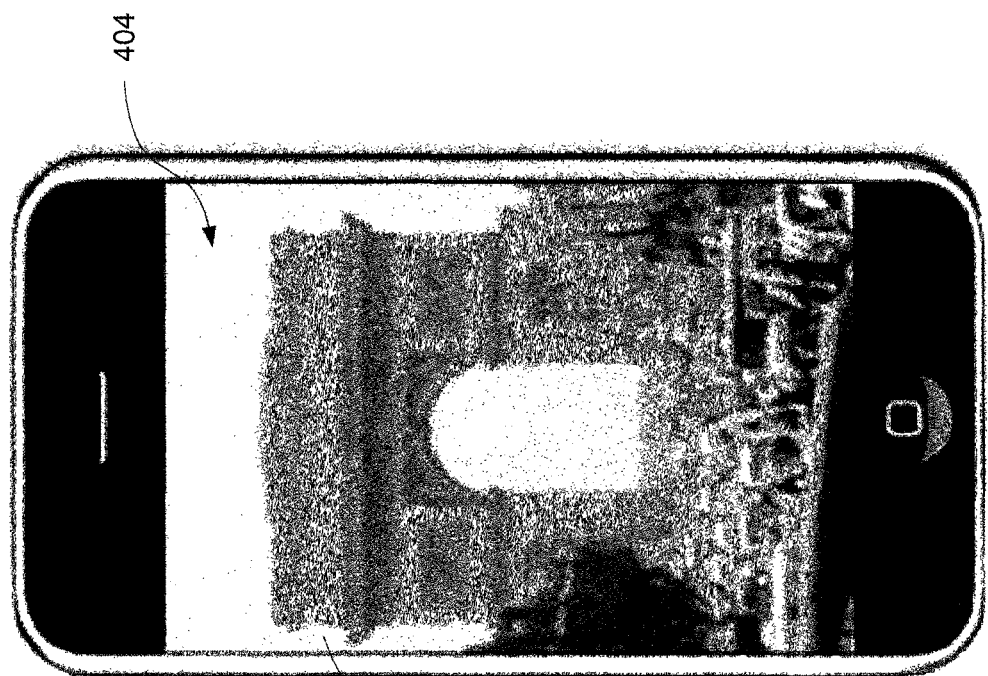

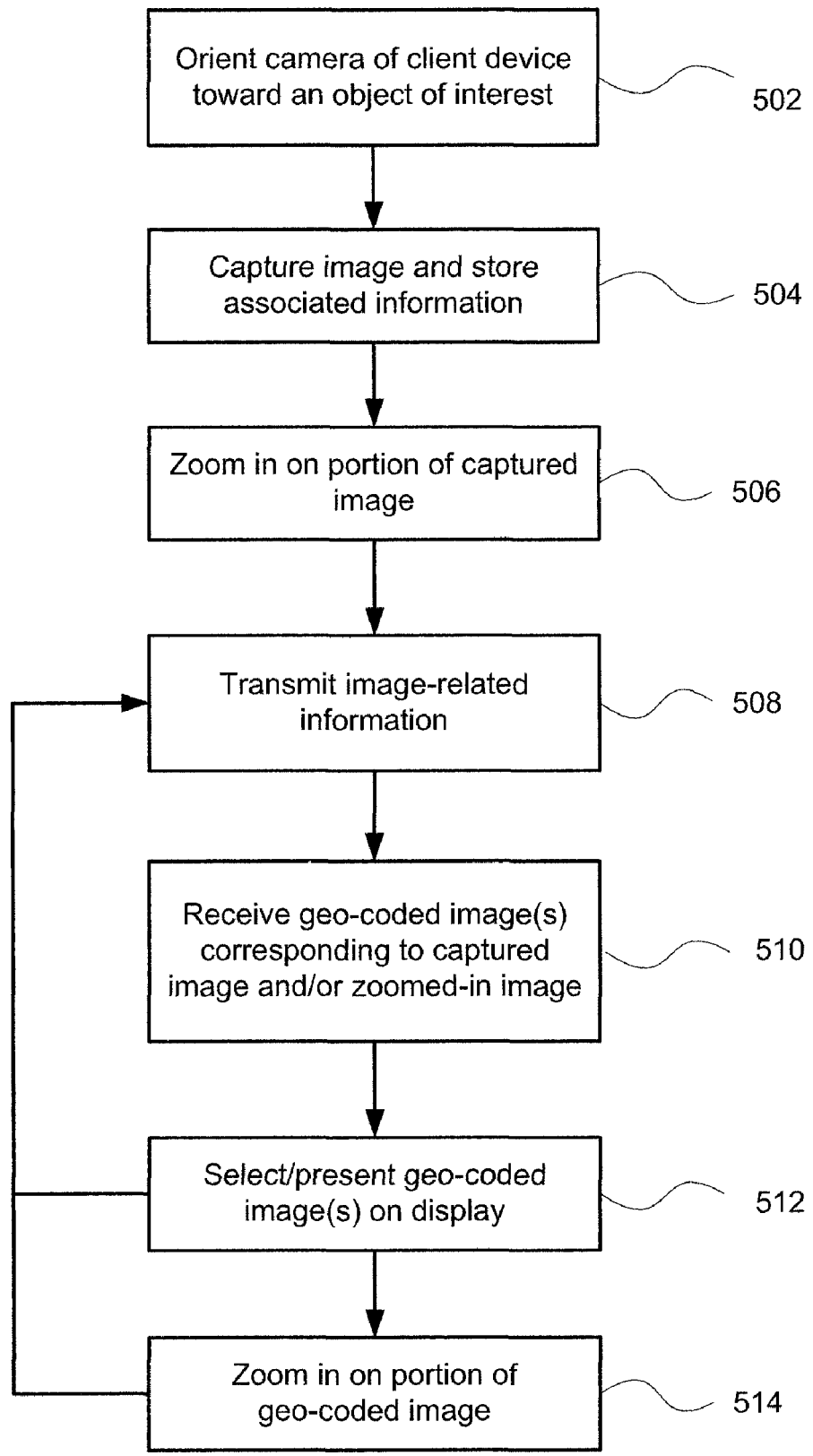

520

IMAGE ZOOMING USING PRE-EXISTING IMAGING INFORMATION

BACKGROUND OF THE INVENTION

1. Field of the Invention

Aspects of the invention relate generally to digital imagery. More particularly, aspects are directed to enhancing digital imaging when the reaching the zoom limit of a camera.

2. Description of Related Art

Digital cameras often provide the user with the ability to zoom in on faraway objects. This zooming capability may be affected by two factors. One is the camera's optical resolution, which is limited by the physical constraints of the camera's lens. The other is interpolated, or digital, zooming. Here, the camera may employ interpolation to digitally enhance the image and focus on a faraway object of interest.

While interpolated resolution permits evaluation of such objects of interest, there is a limit on how far away the camera can zoom. Depending on how interpolated zooming is performed, the quality of the resultant image may suffer. Aspects of the invention address these and other problems.

SUMMARY OF THE INVENTION

In accordance with one embodiment, an image processing method comprises capturing an image of an object of interest using an electronic imaging device of a user device; recording image-related information associated with the captured image; transmitting the image-related information to an external device; receiving from the external device at least one geo-coded image corresponding to the captured image; and presenting the at least one geo-coded image on a display of the user device.

In one example, the method further comprises zooming in on a portion of the object of interest, wherein the image-related information identifies the zoomed in portion of the object of interest. In one alternative, the image-related information is transmitted to the external device if the zooming satisfies a predetermined threshold. In this case, the predetermined threshold may be a resolution limit of the electronic imaging device. In another alternative, the method further comprises zooming in on a region of the received geo-coded image.

In another example, the at least one geo-coded image is correlated with the captured image based upon a geographical location of the object of interest. In this case, the correlation may be further based on time information of the at least one geo-coded image. In a further example, upon capturing the image of the object of interest, the captured image is presented on the user device display, and upon receipt of the at least one geo-coded image, presenting includes replacing the captured image with the at least one geo-coded image. In this case, the at least one geo-coded image may comprise a zoomed-in portion of the object of interest.

In another embodiment, a computer-readable recording medium is recorded with a computer program for use by a processor to perform a process. The process comprises capturing an image of an object of interest using an electronic imaging device of a user device; recording image-related information associated with the captured image; transmitting the image-related information to an external device; receiving from the external device at least one geo-coded image corresponding to the captured image; and presenting the at least one geo-coded image on a display of the user device.

In a further embodiment, an image processing apparatus comprises an imaging device for capturing an image of an object of interest, memory for storing image-related information associated with the captured image, means for transmitting at least some of the image-related information to an external device, means for receiving from the external device a geo-coded image corresponding to the captured image, a display device for presenting at least one of the geo-coded image and the captured image, and a processor that controls the imaging device, memory, means for transmitting, means for receiving and the display. Here, the geo-coded image is presented on the display device to replace the captured image of the object of interest.

In one example, the imaging device is operable to zoom in on a portion of the object of interest and the image-related information identifies the zoomed in portion of the object of interest. In an alternative, the image-related information is transmitted to the external device if the zooming satisfies a predetermined threshold. In this case, the predetermined threshold may be a resolution limit of the electronic imaging device. In another example, the geo-coded image comprises a zoomed-in portion of the object of interest.

And in another embodiment, an image processing system comprises means for receiving image-related information from a user device, the image-related information including data associated with an image of an object of interest captured by the user device; memory storing geo-coded images; processor means for correlating at least one of the geo-coded images with the captured image based upon the image-related information; and means for transmitting the correlated geo-coded image to the user device.

In one example, the image-related information includes a geographical location of the object of interest and the processor means correlates the at least one geo-coded image the captured image based upon a geographical location of the object of interest. In an alternative, the processing means ranks relevant geo-coded images based upon at least one of location, orientation, weather condition, image resolution or zooming level. In another alternative, the correlation is further based on time information of the at least one geo-coded image. In this case, the time information may include at least one of a time of day or season.

BRIEF DESCRIPTION OF THE DRAWINGS

FIGS. 5A-C illustrate, in accordance with aspect of the inventions, object position data representing the geographic position of surfaces of geographic objects.

FIG. 6 illustrates the front of a device in accordance with aspects of the invention.

FIG. 7 illustrates the rear of the device of FIG. 6 in accordance with aspects of the invention.

FIG. 10 illustrates orienting a camera of a device in a direction towards a point of interest.

FIG. 11 illustrates a device and its display of information in accordance with an aspect of the invention.

FIGS. 12A-D illustrate image capture, manipulation and replacement in accordance with aspects of the invention.

FIG. 13 is a flow diagram of image management in accordance with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Figure 1:
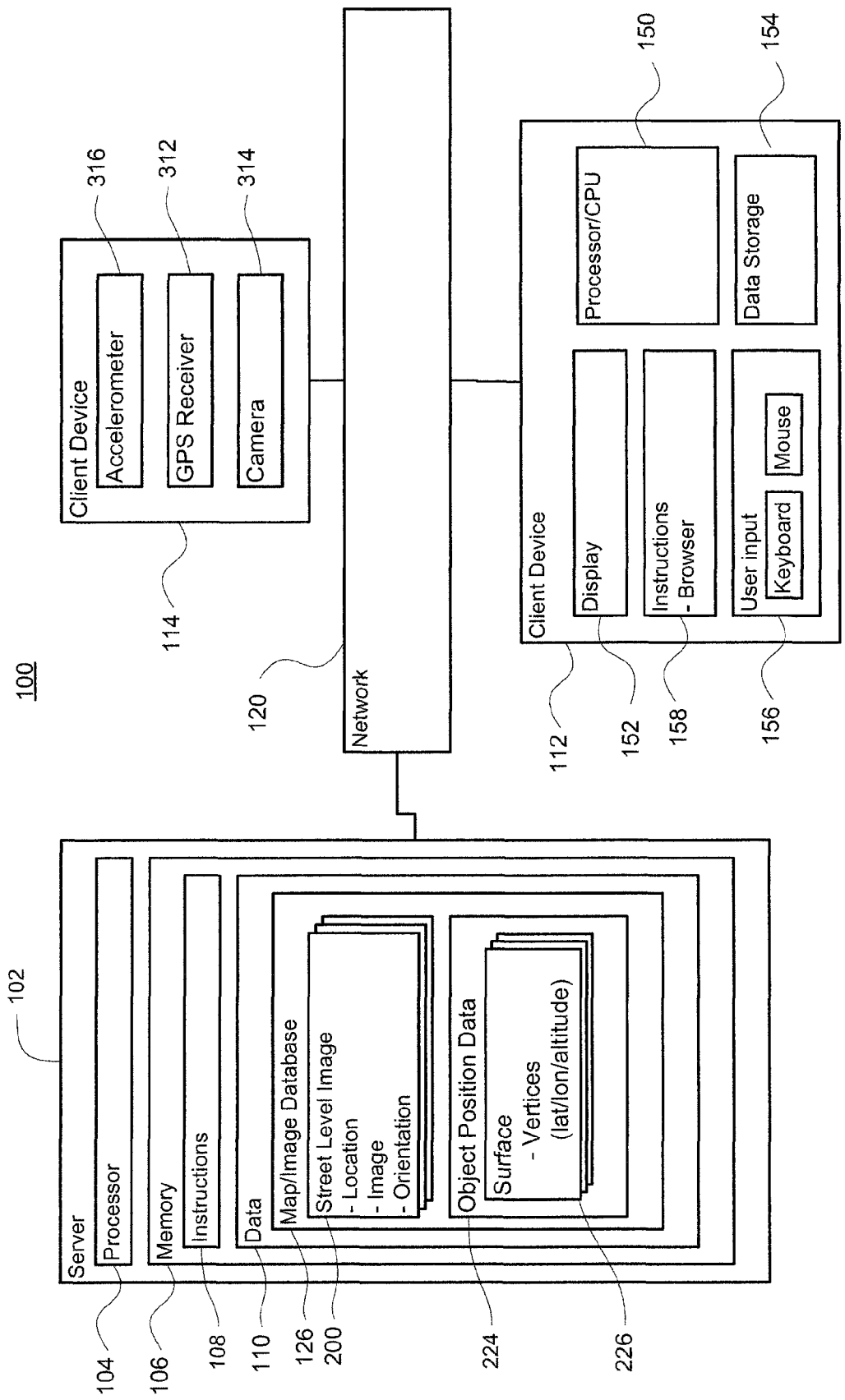
FIG. 1 illustrates a system in accordance with aspects of the invention.
Figure 2:
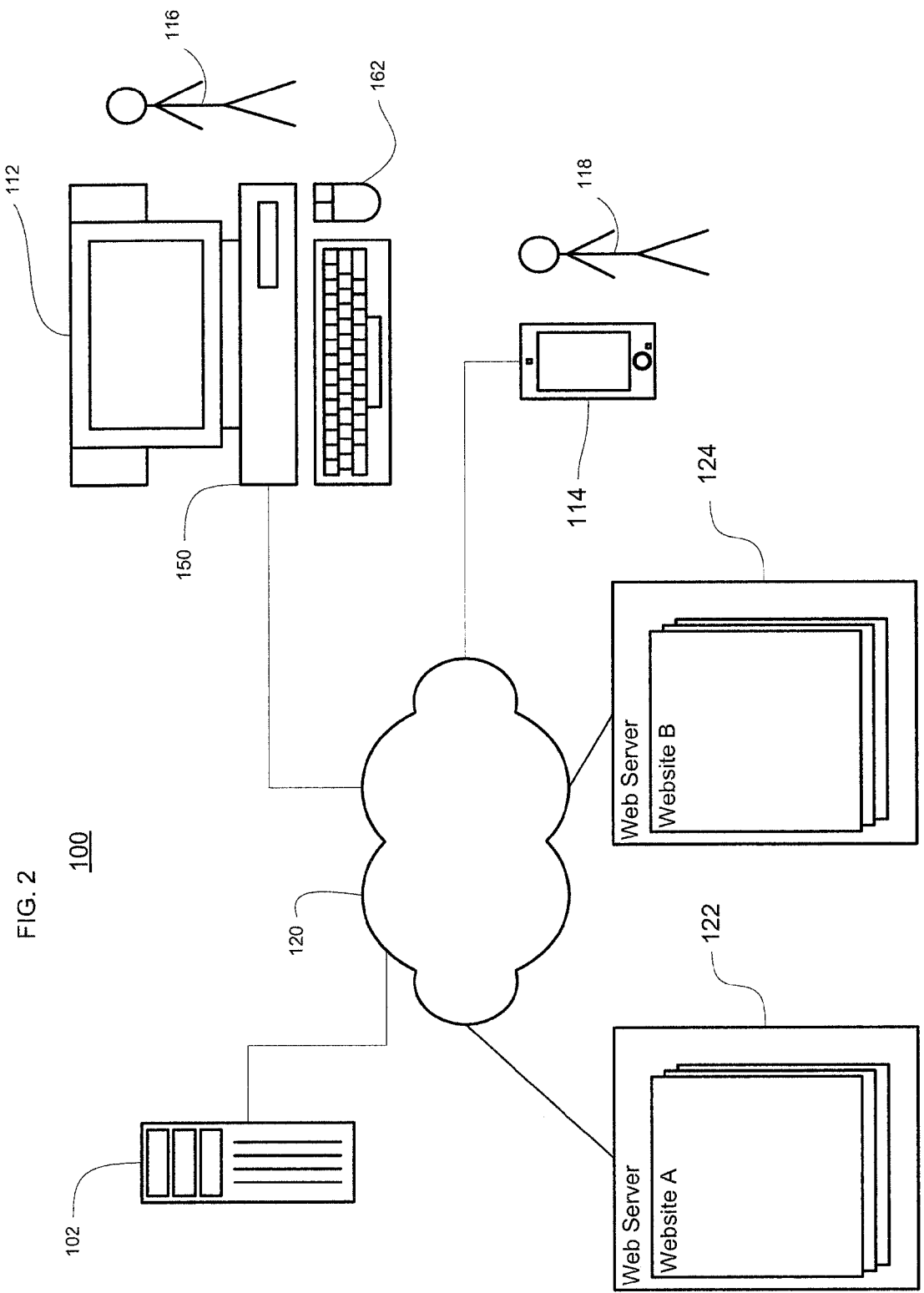
FIG. 2 illustrates further aspects of the system of FIG. 1.

As shown in FIGS. 1-2, a system 100 in accordance with one aspect of the invention includes a computer 102 containing a processor 104, memory 106 and other components typically present in general purpose computers.

Memory 106 stores information accessible by processor 120, including instructions 108 that may be executed by the processor 104. It also includes data 110 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 104 may be any well-known processor, such as processors from Intel Corporation or AMD. Alternatively, the processor may be a dedicated controller such as an ASIC.

The instructions 108 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. For example, instructions 108 may include search instructions for executing searches, and may include update instructions for sending update information. Functions, methods and routines of the instructions are explained in more detail below.

Data 110 may be retrieved, stored or modified by processor 104 in accordance with the instructions 108. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Data 110 may include search data for use when executing search instructions. Data 110 may also include information gathered from other nodes of the network relating to suspicious activity. For example, and as described more below, data 110 may include a site log that associates identifications of websites with values indicative of whether the website is likely to be associated with unwanted behavior. Computer 102 or another computing device may access the data 110 when performing some or all of the functions described below.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on a removable CD-ROM or DVD-ROM and others within a read-only computer chip. Some or all of the instructions and data may be stored in a location physically remote from, yet still accessible by, the processor. Similarly, the processor may actually comprise a collection of processors which may or may not operate in parallel.

In one aspect, the computer 110 is a server communicating with one or more client devices 112 and 114. For example, computer 110 may be a web server. Each client device may be configured similarly to the server 110, with a processor, memory and instructions. Each client device 112 and 114 may be a personal computer, intended for use by a person 116 and 118 (see FIG. 2), having all the internal components normally found in a personal computer such as a processor/central processing unit (CPU) 150, display device (for example, a monitor having a screen, a projector, a touch-screen, a small LCD screen, a television, or another device such as an electrical device that is operable to display information processed by the processor) 152, CD-ROM, hard-drive or other data storage device 154, user input 156 for example, a mouse, keyboard, touch-screen or microphone), speakers, modem and/or network interface device (telephone, cable or otherwise) and all of the components used for connecting these elements to one another. A browser or other user interface platform 158 may work in conjunction with the display 152 and user input 156. Moreover, computers in accordance with the systems and methods described herein may comprise any device capable of processing instructions and transmitting data to and from humans and other computers including general purpose computers, PDAs, network computers lacking local storage capability, and set-top boxes for televisions.

Although the client devices 112 and 114 may comprise a full-sized personal computer, the systems and methods herein may also be used in connection with mobile devices capable of wirelessly exchanging data with a server over a network such as the Internet. For example, a client device 114 may be a wireless-enabled PDA such as a Blackberry phone or an Internet-capable cellular phone. In either regard, the user may input information using a small keyboard (such as in the case of a Blackberry phone), a keypad (such as in the case of a typical cell phone), a touch screen (in the case of a PDA) or any other means of user input.

The server 102 and client devices 112 and 114 are capable of direct and indirect communication, such as over a network 120. For example, server 102 may receive a search request from a client device such as client device 112. Processor 104 may execute search instructions and may use search data to obtain search results. Server 102 may send the search results to client device for display to the user 116.

Server 102 and client devices 112 and 114 may also be capable of direct and indirect communication with additional computers on the network 120. For example, FIG. 1 illustrates that web servers 122 and 124 may also be 122 connected to network 120. Web servers 122 and 124 may operate websites such as websites A and B. Although only a few computers are depicted in FIGS. 1-2, it should be appreciated that a typical system can include a large number of connected computers, with different computers being at different nodes of the network 120.

The network, and intervening nodes, may comprise various configurations and protocols including the Internet, World Wide Web, intranets, virtual private networks, wide area networks, local networks, private networks using communication protocols proprietary to one or more companies, Internet relay chat channels ("IRC"), instant messaging, simple mail transfer protocols ("SMTP"), Ethernet, WiFi and HTTP, and various combinations of the foregoing. Such communication may be facilitated by any device capable of transmitting data to and from other computers, such as modems (e.g., dial-up, cable or fiber optic) and wireless interfaces.

As shown in FIG. 1, the server 102 may include or may be logically associated with a map/image database 126. The map database 126 may be part of the data 110 stored in memory 106, or may be maintained in separate storage. Although the invention is not limited by any particular data structure, the map database information may be stored in computer registers, in a relational database as a table having a plurality of different fields and records, XML documents, or flat files. Certain image-related data such as map data may be stored in flat files such as keyhole flat files ("KFF").

Figure 3:
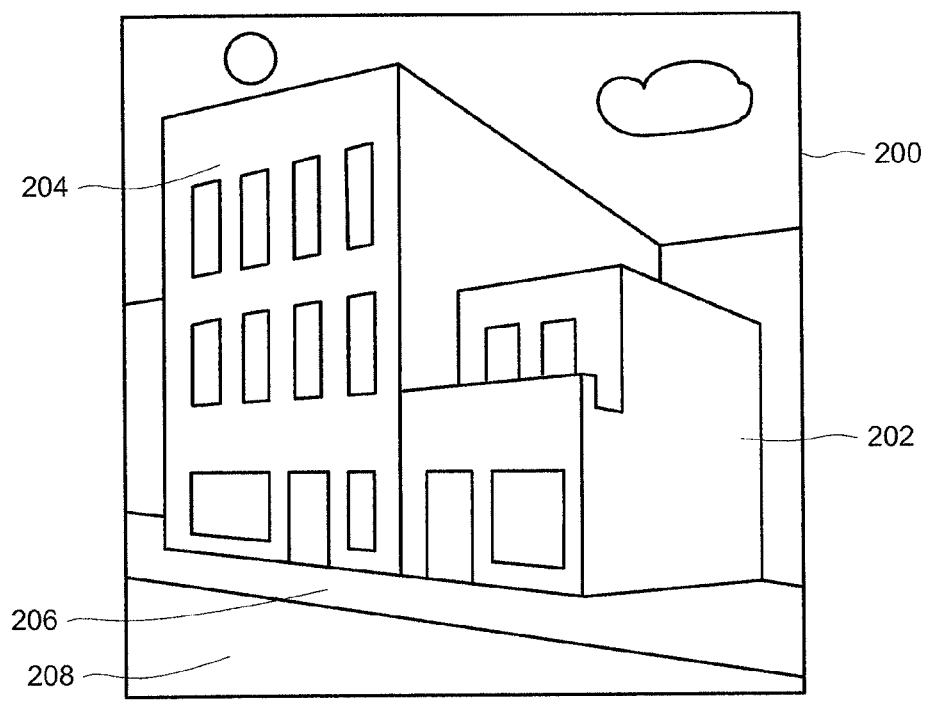
FIG. 3 is a street level image in accordance with an aspect of the invention, captured by a camera
Figure 4:
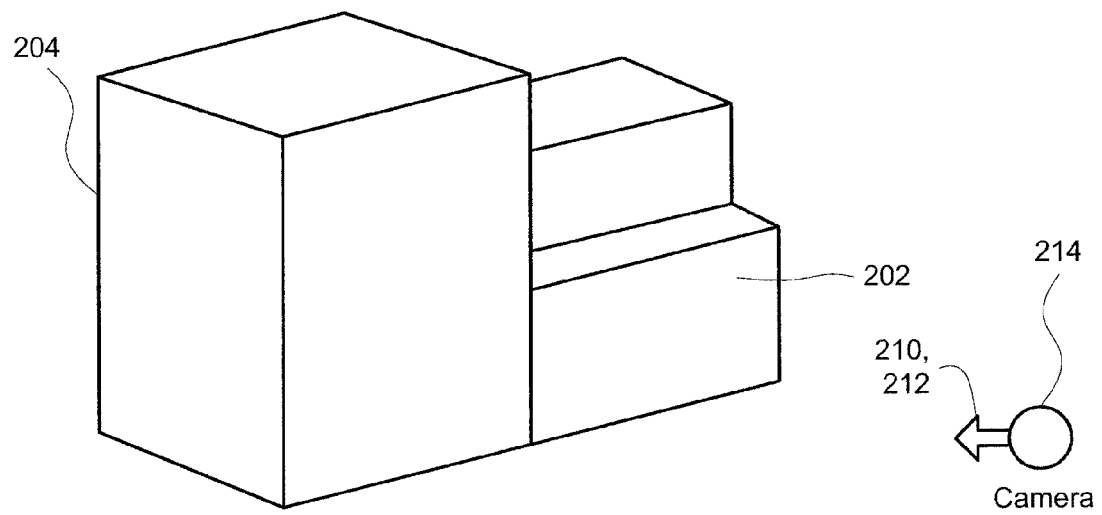
FIG. 4 is a diagram functionally illustrating, in accordance with an aspect of the invention, relative geographic positions of objects within a street level image and the position and angle of a camera used to capture the street level image.

In addition to other map data, the map database 126 may also store street level images 200. An example of a street level image is an image of geographic objects that was captured by a camera at an angle generally parallel to the ground, or where the camera is positioned at or near ground level. Both the geographic objects in the image and the camera have a geographic location relative to one another. Thus, as shown in FIG. 3, street level image 200 may represent various geographic objects such as buildings 202 and 204, sidewalks 206 and street 208. It will be understood that while street level image 200 only shows a few objects for ease of explanation, a typical street level image will contain as many objects associable with geographic locations (street lights, mountains, trees, sculptures bodies of water, vehicles, people, etc.) in as much detail as may be captured by an imaging device such as a digital camera. FIG. 4 pictorially illustrates the geographic locations of the buildings 202 and 204 relative to the geographic position 210 and angle 212 of a camera 214 when the image was captured.

The objects in the street level images may be captured in a variety of different ways. For example, the street level image may be captured by a camera mounted on top of a vehicle, from a camera angle pointing roughly parallel to the ground and from a camera position at or below the legal limit for vehicle heights (e.g., 7-14 feet). (Street level images are not limited to any particular height above the ground; a street level image may be taken from the top of building.) Panoramic street-level images may be created by stitching together a plurality of photographs taken from different camera angles. The camera may be any device capable of capturing optical images of objects including film cameras, digital still cameras, analog video cameras and image sensors (by way of example, CCD, CMOS or other).

In addition to being associated with geographic locations, street level images 200 are typically associated with information indicating the orientation of the image. For example, if the street level image comprises a typical photograph, the orientation may simply be the camera angle such as an angle that is 30° east of true north and rises 2° from ground level. If the street level images are panoramic images, such as 360° panoramas centered at the geographic location associated with the image, the orientation may indicate the portion of the image that corresponds with looking due north from the camera position at an angle directly parallel to the ground.

Street level images may also be stored in the form of videos, such as by displaying MPEG videos captured by an analog video camera or displaying, in succession, time-sequenced photographs that were captured by a digital still camera.

In one aspect, the geographic locations of the surfaces facing the camera that captured the images are stored as polygons. Thus, as shown in FIGS. 5A-B, surface 220 of building 204 may be defined as a polygon 222 having four vertices, each vertex being associated with a different geographic position. As shown in FIG. 5C, the object position data vertices, in turn, may be stored in terms of their latitude, longitude and altitude positions, such as a coordinate of the form ($Lat_2°$, $Lon_2°$, $Alt_2$ meters). In that regard, the surface 220 of building 204 may be stored as object position data 224, which may be maintained as a collection of geographic positions ($Lat_2$, $Lon_2$, $Alt_2$), ($Lat_3$, $Lon_3$, $Alt_3$), ($Lat_4$, $Lon_4$, $Alt_4$) and ($Lat_5$, $Lon_5$, $Alt_5$). Thus, the polygon 222 defines the geographic locations of a plurality of points, namely, the points within the bounds of the polygon. Surfaces 220 of other objects may be similarly stored as surface data 226 (see FIG. 1), as well as the position and orientation of the camera that captured the image.

Other formats for storing the object position data may also be used. For example, a separate value may be stored for each pixel of the street level image where the value represents the geographic position of the surface that is illustrated at that pixel. Thus, the pixel at row $y_a$ and column $x_a$ (hereafter, "($x_a$, $y_a$)") of the street level image may represent a portion of the surface of building 202 at that pixel. One of the values associated with the pixel may be the color and brightness of that portion of the surface as captured by the camera. The other value associated with the pixel may be the geographic position of that portion of the surface. Pixels that are not associated with a surface may be associated with a null or default surface value. In that regard, and similar to the object position data associated with polygons, the object position data may define the geographic position of a plurality of points. In still another aspect, the object position data may store the distances from the objects to the camera at each pixel of the image.

Such image and object position data may be stored in the map/image database 126 shown in FIG. 1. Depending on the system configuration, the database may be maintained as part of the server 102 or web server 122 or 124. Alternatively, the database may be configured for remote access by one or more servers or client devices. As will be explained in detail below, this imaging information, including the street level images and surface data, may be retrieved upon request to augment or replace an image taken in real time by a user.

Rather than being associated with absolute values such as latitude/longitude, the values of the object position data may be relative to any geographic reference system and in any scale. In various aspects of the system and method, when a first type of information is used to store the object position data (such as storing the latitude, longitude and altitude of the camera and surface), information of another type may be generated from it (such as calculating the distance between the camera and a surface). For example, if the object position data stores surfaces as a cloud of discrete coordinates, the geographic position of points in between the stored coordinates may be extrapolated from the nearest, neighboring coordinate(s).

Certain formats permit the surface information to be stored independently of the street level images taken by the camera. For example, object position data stored as described in FIG. 5C may be stored without reference to the street level image or camera position. If the object position data for a street level image is required, such object position data may be retrieved by querying those surfaces that are proximate to the street level image's camera position and in front of other surfaces.

A variety of systems and methods may be used to collect the surface information. By way of example only, a laser range finder may be used. In addition, stereoscopic systems employing two cameras, spaced slightly apart yet looking at the same scene, may be used as well; by analyzing the slight differences between the images seen by each camera, it is possible to estimate the distance at each point in the images. In yet another aspect, the information may be compiled by using a single video camera, travelling at a particular velocity, to capture the street level imagery as the scenery passes by. The video may not only be used as the street level image, but subsequent frames may be compared to extract the different distances between the objects and the camera (e.g., mountains in the distance will stay in the frame much longer than a fire hydrant passing by along the street).

Client devices 112 and 114 (see FIGS. 1-2) may include a geographic position detector and geographic orientation detector to determine the geographic position and orientation of the device. For example, client device 114 may include a GPS receiver to determine the device's latitude, longitude and altitude position. The component may also comprise software for determining the position of the device based on other signals received at the client device 114, such as signals received at a cell phone's antenna from one or more cell phone towers if the client device is a cell phone. It may also include an accelerometer or gyroscope to determine the direction in which the device is oriented. By way of example only, the device may determine its pitch, yaw or roll (or changes thereto) relative to the direction of gravity and a plane perpendicular thereto.

One manner of expressing the geographic orientation of the client device 114 is shown in FIGS. 6-9. As shown in FIG. 6, the client device 114 may be a PDA/phone having a touch-screen display 300, general-purpose button 302, speaker 304, and microphone 306 on the front. The left side includes volume button(s) 308. The top side includes a cell-phone antenna 310 and GPS receiver 312. As shown in FIG. 7, the back includes a camera 314. The camera may be oriented in a particular direction (hereafter, "camera angle"). And as shown in the front panel of FIG. 6, a zooming button or other actuator 318 may be used to zoom in and out of an image on the display.

Figure 8:
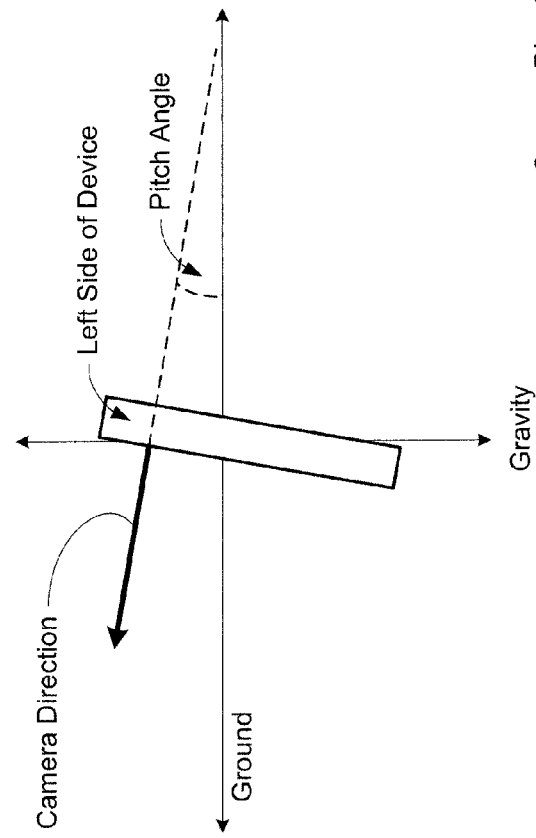
FIG. 8 is a diagram functionally illustrating, in accordance with an aspect of the invention, the orientation of a device relative to ground level.
Figure 9:
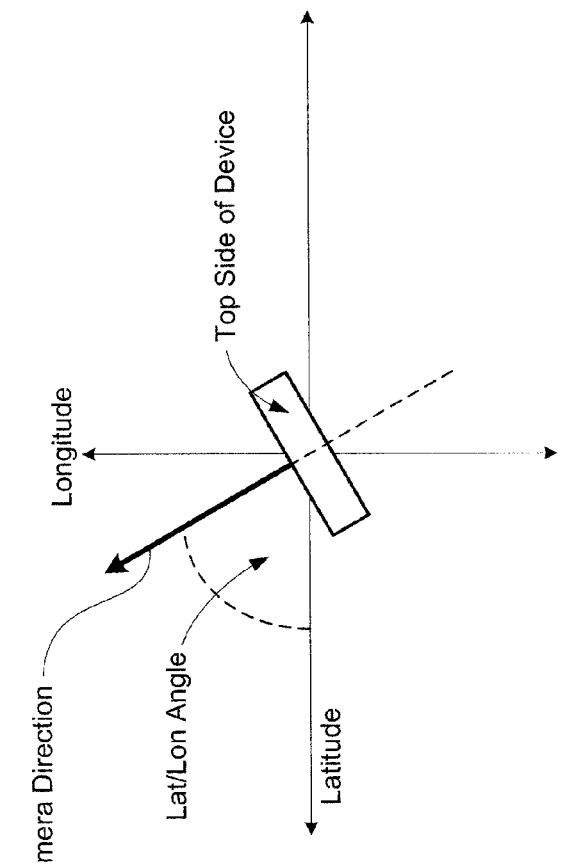
FIG. 9 is a diagram functionally illustrating, in accordance with an aspect of the invention, the orientation of a device relative to latitude and longitude.

The camera angle may be expressed in three-dimensions as shown by the compass rose in FIG. 7 and schematically in FIGS. 8 and 9. It shall be assumed for ease of understanding and not limitation that the camera angle is fixed relative to the orientation of the device. In that regard, FIG. 8 illustrates a potential pitch of the device (as seen looking towards the left side of the device) relative to the ground, e.g., relative to the plane perpendicular to the direction of gravity. FIG. 9 illustrates a potential latitude/longitude angle of the device (as seen looking down towards the top side of the device), e.g., the camera direction in which the camera points relative to the latitude and longitude. Collectively, the pitch and latitude/longitude angle define a camera angle in three-dimensions. These angles may be outputted as numerical values by the accelerometer 316 (see FIG. 1), used by the device's processor, and stored in the memory of the device.

Various operations in accordance with a variety of aspects of the invention will now be described. It should be understood that the following operations do not have to be performed in the precise order described below. Rather, various steps can be handled in different orders or simultaneously.

In one aspect, a user may position the client device 114 with the camera 314 facing an object of interest. In that regard, as shown in FIG. 10, the user may stand in front of an object of interest 400, such as a building or monument, and orient the camera 314 in a direction 402 that points toward a spot 404 on the point of interest.

The camera 314 of the client device 114 may be used to help the user orient the device 114 to the desired position on the object of interest 400. For example, as shown in FIG. 11, the phone's processor may periodically update the display 300 so that it continuously shows the image currently captured by the camera 314. In that regard, the display 300 may also display a target, bull's-eye or some other indicator 406 to indicate the exact or approximate position of the object at which the device 114 is pointed.

Figure 12D:
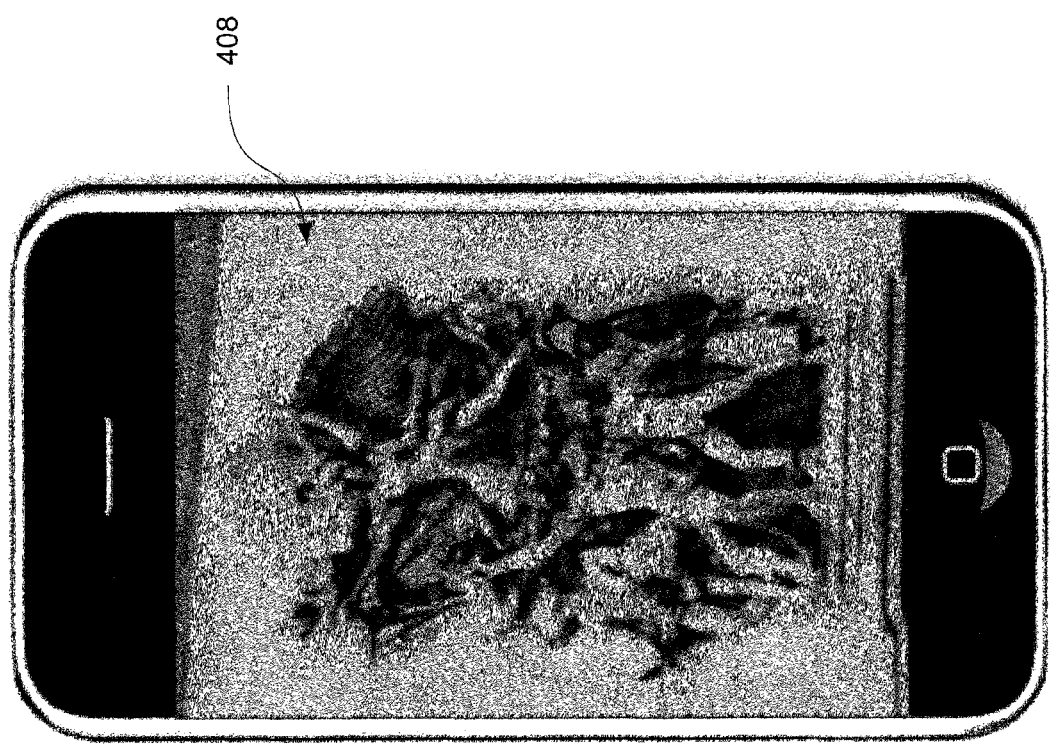

FIGS. 12A-D illustrate one example in which the camera of client device 114 is oriented towards an object of interest 400, namely the Arc de Triomphe in Paris, France. The image 402 taken by the camera is presented on the display 300. FIG. 12B illustrates a second image 404 which zooms in on the object of interest 400. This zoomed image 404 may be formed by optical zooming, digital zooming, or a combination of optical and digital zooming. Due to the zooming, certain features may be blocky or pixilated.

Figure 12C:
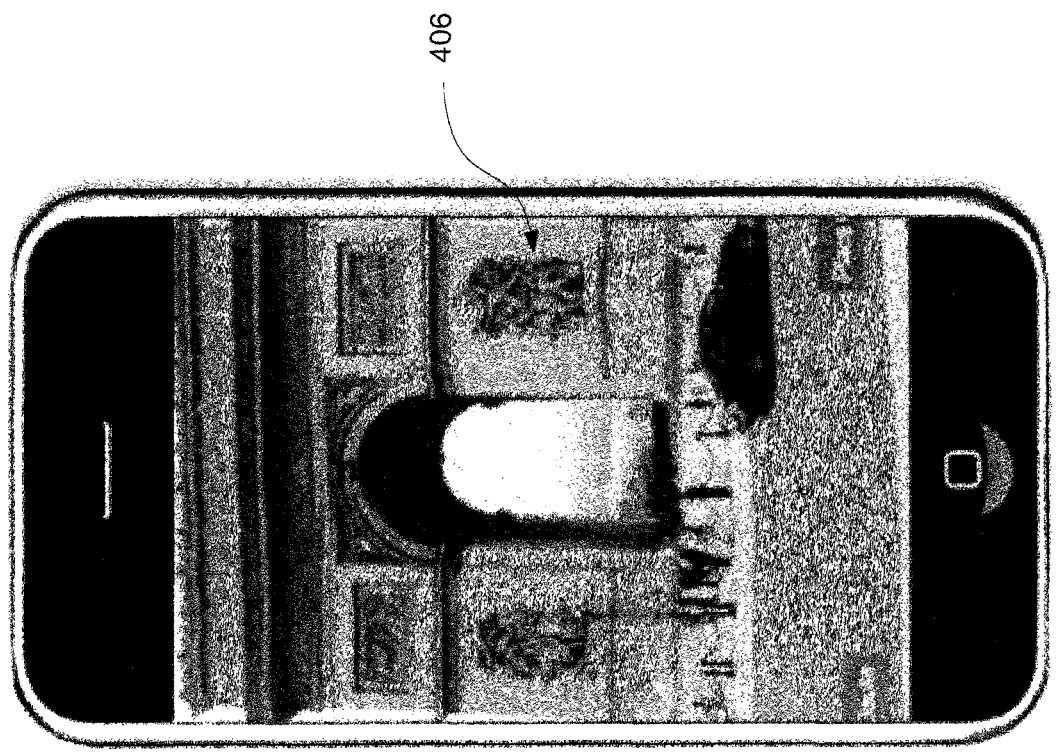

Due to the limits on the camera's zooming capability, the user may be unable to zoom any closer on the object of interest 400. However, a preexisting image database is used to enhance the image presented on the display 300. Turning to FIG. 12C, here the image 406 may comprise a street level image 200 (see FIG. 3) that has been stored in map/image database 126 (see FIG. 1). Location information associated with the client device 114 and camera 314 may be used to retrieve the image 406 from the map/image database 126.

By way of example only, the latitude, longitude, pitch and angle of the client device and camera, which may be determined by the GPS receiver 312 and accelerometer 316, may be used along with an estimation of the distance to the object of interest. This information may be transmitted, e.g., via a wireless link, across the network 120 to the server 102 or web servers 122 or 124. Then the server, such as server 102, may search the database 126 or other image database to find the closest matching image(s) based upon the received information and any applicable geo-tagged information in the database. At this point, one or more of the closest corresponding images may be sent to the client device 114 for presentation on the display 300.

In one example, the initial image 402 or the zoomed image 404 may be replaced by a particular one of the corresponding images from the database. And as shown in FIG. 12D, the user may zoom in on a portion of the image 404 to obtain image 408. This may be done, for instance, by using the actuator 318 on the client device 114 (see FIG. 6). Thus, the user may start with an initial image 402 captured by the camera 314 on the client device 114, zoom in to obtain image 404, and then obtain enhanced imagery in the form of images 406 and/or 408 based on geo-coded images in a remote database. Depending upon the imagery available in the remote database, the user may effectively infinitely zoom in on an object of interest. This avoids having to carry telephoto lenses or other cumbersome and expensive equipment.

In one alternative, the geo-coded imagery stored in the database and the images captured by the camera 314 on the client device 114 may be date and/or timestamped. Thus, in addition to searching for images based on geolocation information, the server may also refine the search based on time information. For instance, if the user captures the image 402 at a certain time of day (e.g., dawn) at a certain time of year (e.g., fall), then the server may rank images of the same location and orientation based upon how closely they match this time information. And in another alternative, the server may rank the images based on resolution quality. In this case, a greater resolution image may be ranked higher than a lower resolution image.

FIG. 13 provides a flow diagram 500 for one process employed by a client device to capture an initial image and substitute that image with a geo-coded image from a database. As shown in block 502, the client device's camera is oriented toward an object of interest. Then in block 504, an image of the object of interest is captured. Upon image capture, geolocation information about the image and/or client device is determined as set forth above. Such information may be stored in the memory of the user device. Additional applicable image information, such as image orientation (e.g., portrait or landscape view, resolution, whether a flash was used, etc.) may also be recorded and associated with the captured image).

As shown in block 506, the user may choose to zoom in on a portion of the captured image. The zoomed-in portion of the image may be associated with a surface of the object of interest. In block 508, image-related information is transmitted to an entity such as a remote server, and in block 510 one or more geo-coded images corresponding to the captured image and/or the zoomed-in portion of the image are received. Upon receipt, one or more selected geo-coded images are presented on the display of the client device as shown in block 512. The selection and presentation of the geo-coded image(s) may be performed based on any of the criteria set forth above. And as shown in block 514, a portion of a given geo-coded image may be zoomed in on.

As the received image(s) includes geo-coded information, the user may transmit image related position information to the server or other entity for such received image(s) and obtain additional geo-coded images from the in return. This provides an "infinite zooming" effect by allowing the user to obtain additional imagery for the object of interest. Furthermore, the user may request different levels of zoomed-in imagery from the server, or images from different vantage points. Thus, returning to FIG. 12D, the zoomed-in geo-coded image presents a particular frieze on the Arc de Triomphe. The user may request a view of a different portion of the Arc de Triomphe which may or may not have been visible from the original image captured by the client device. Thus, the system may provide an image showing a frieze section on the opposite side of the monument than what was originally displayed. This may be done by requesting images showing different surfaces or vertices of the original image.

Figure 14:
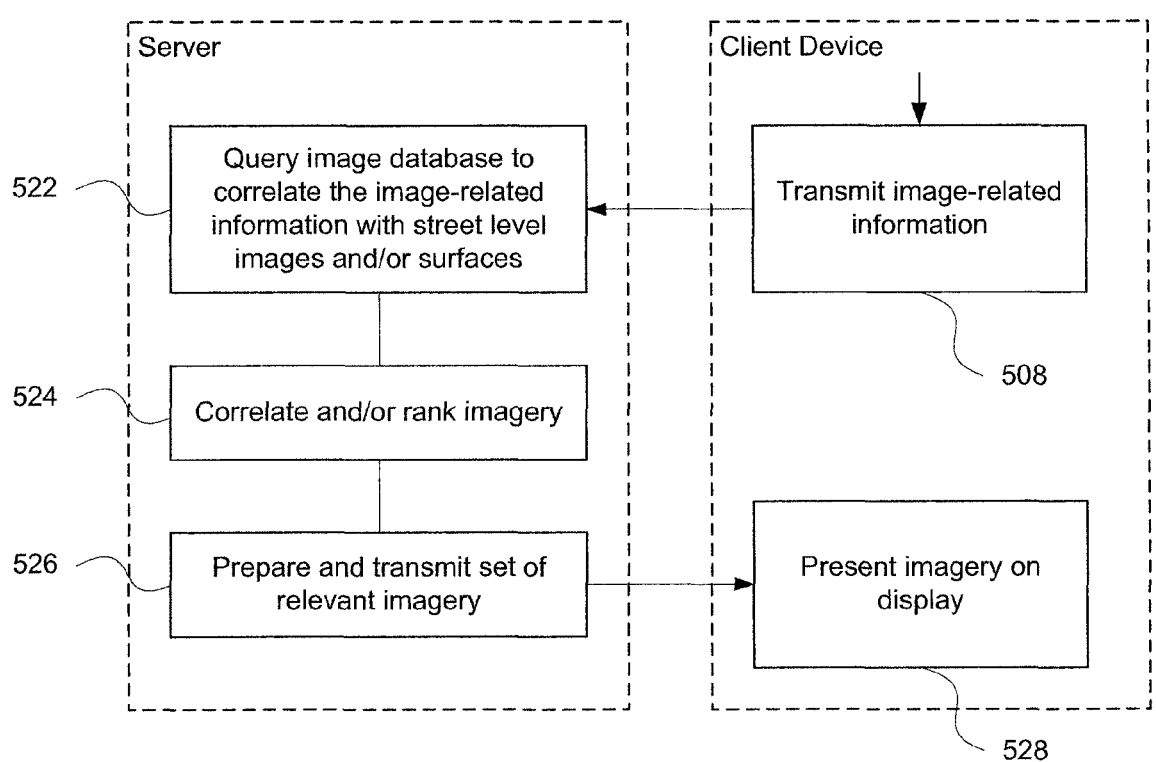
FIG. 14 is a flow diagram of system operation in accordance with aspects of the invention.

FIG. 14 illustrates one process 520 by which a remote entity provides geo-coded imagery to a client device. As discussed above with regard to FIG. 13, once an image is obtained, then at block 508 the client device transmits image-related information to a server or other remote entity. Such information may include the position and orientation of the client device, as well as information concerning the captured image as set forth above. At block 522, a map/image database is queried to identify street level images and/or surfaces which correlate to the image-related information received from the client device. The database may also be updated to include any images provided as part of the image-related information sent by the client device.

At block 524, any such images or surfaces which correlate with the received information are flagged or otherwise identified. A processor such as processor 104 of FIG. 1 may correlate and rank the imagery based upon at least one of location, orientation, time of day, season, weather condition, image resolution, zooming level, any requests for views from the user and the like. Based on the correlated or ranked imagery, a set of relevant imagery is prepared and sent to the client device, as shown in block 526. Upon receipt by the client device, such information may be stored or cached by the client device and presented on a display to the user as per block 528.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. An image processing method, comprising:
capturing an image of an object of interest using an electronic imaging device of a user device;
receiving a command to zoom into a portion of the object of interest by a zoom amount, and in response to determining that the zoom amount meets a predetermined threshold:
transmitting image-related information to an external device, wherein the image-related information indicates a distance from the user device to the object of interest and the portion of the object to be zoomed into;
receiving from the external device at least one geo-coded image corresponding to the captured image, the received image depicting at least a part of the object of interest; and
presenting the at least one geo-coded image on a display of the user device.

2. The image processing method of claim 1, wherein the predetermined threshold is a resolution limit of the electronic imaging device.

3. The image processing method of claim 1, further comprising zooming in on a region of the receiving geo-coded image.

4. The image processing method of claim 1, wherein the at least one geo-coded image is correlated with the captured image based upon a geographical location of the object of interest.

5. The image processing method of claim 4, wherein the correlation is further based on time information of the at least one geo-coded image.

6. The image processing method of claim 1, wherein upon capturing the image of the object of interest, the captured image is presented on the user device display, and upon receipt of the at least one geo-coded image, presenting includes replacing the captured image with the at least one geo-coded image.

7. The image processing method of claim 6, wherein the at least one geo-coded image comprises a zoomed-in portion of the object of interest.

8. A non-transitory computer-readable recording medium recorded with a computer program for use by a processor to perform a process comprising:
capturing an image of an object of interest using an electronic imaging device of a user device;

receiving a command to zoom into a portion of the object of interest by a zoom amount, and in response to determining that the zoom amount meets a predetermined threshold:

transmitting image-related information to an external device, the image-related information indicating a distance from the user device to the object of interest and the portion of the object to be zoomed into;

receiving from the external device at least one image, corresponding to the captured image, that depicts the object of interest, the received image being geo-coded to include an indication of a position that is usable to retrieve another image depicting the object of interest; and presenting the at least one geo-coded image on a display of the user device.

9. An image processing apparatus, comprising:

an imaging device for capturing an image of an object of interest;

memory for storing image-related information associated with the captured image;

means for receiving a command to zoom into a portion of the object of interest by a zoom amount;

means for transmitting, in response to determining that the zoom amount meets a predetermined threshold, at least some of the image-related information to an external device, the image related information indicating a distance from the user device to the object of interest and the portion of the object to be zoomed into;

means for receiving from the external device an image, corresponding to the captured image, that depicts at least a part of the object of interest, the received image being geo-coded to include an indication of a position that is usable by the apparatus to retrieve another image that corresponds to the received image;

a display device for presenting at least one of the geo-coded image and the captured image; and a processor that controls the imaging device, memory, means for transmitting, means for receiving the command, means for receiving the image corresponding to the captured image, and the display;

wherein the received geo-coded image is presented on the display device to replace the captured image of the object of interest.

10. The image processing method of claim 9, wherein the predetermined threshold is a resolution limit of the electronic imaging device.

11. The image processing apparatus of claim 9, wherein the geo-coded image comprises a zoomed-in portion of the object of interest.

12. An image processing system, comprising:

means for receiving image-related information from a user device, the image-related information including data associated with an image of an object of interest captured by the user device, wherein the image-related information comprises an indication of a distance from the user device to the object of interest and an indication of a portion of the object of interest to be zoomed into;

memory storing geo-coded images;

processor means for correlating at least one of the geo-coded images with the captured image based upon the indication of the distance from the user device to the object of interest and the indication of the portion of the object of interest to be zoomed into; and means for transmitting the correlated geo-coded image to the user device.

13. The image processing system of claim 12, wherein the image-related information includes a geographical location of the object of interest and the processor means correlates the at least one geo-coded image the captured image based upon a geographical location of the object of interest.

14. The image processing system of claim 13, wherein the processor means ranks relevant geo-coded images based upon at least one of location, orientation, weather condition, image resolution or zooming level.

15. The image processing system of claim 13, wherein the correlation is further based on time information of the at least one geo-coded image.

16. The image processing system of claim 15, wherein the time information includes at least one of a time of day or season.

* * * * *

UNITED STATES PATENT AND TRADEMARK OFFICE
CERTIFICATE OF CORRECTION

PATENT NO. : 8,274,571 B2  
APPLICATION NO. : 12/469905  
DATED : September 25, 2012  
INVENTOR(S) : Jiajun Zhu Page 1 of 1

It is certified that error appears in the above-identified patent and that said Letters Patent is hereby corrected as shown below:

In the Claims

Column 12, line 29, after "geo-coded image" insert --with--

Signed and Sealed this
Second Day of September, 2014

Michelle K. Lee
*Deputy Director of the United States Patent and Trademark Office*